US012768400B2

(12) United States Patent
Monnich, Jr. et al.

(10) Patent No.: US 12,768,400 B2
(45) Date of Patent: Oct. 20, 2026

(54) GUIDED STRIP SEAL FOR LINEAR ACTUATOR

(71) Applicant: Parker-Hannifin Corporation, Cleveland, OH (US)

(72) Inventors: James K. Monnich, Jr., Greensburg, PA (US); Brian L. Favero, Pittsburgh, PA (US); Frank Krakosh, III, Latrobe, PA (US)

(73) Assignee: Parker-Hannifin Corporation, Cleveland, OH (US)

( * ) Notice: Subject to any disclaimer, the term of this patent is extended or adjusted under 35 U.S.C. 154(b) by 433 days.

(21) Appl. No.: 18/357,564

(22) Filed: Jul. 24, 2023

(65) Prior Publication Data

US 2024/0093765 A1 Mar. 21, 2024

Related U.S. Application Data

(60) Provisional application No. 63/375,968, filed on Sep. 16, 2022.

(51) Int. Cl.
*F16C 29/08* (2006.01)
*B23Q 1/42* (2006.01)
(Continued)

(52) U.S. Cl.
CPC ............. *F16C 29/082* (2013.01); *F16J 15/16* (2013.01); *B23Q 1/42* (2013.01); *B23Q 11/085* (2013.01);
(Continued)

(58) Field of Classification Search
CPC ...... F16C 29/02; F16C 29/082; F16C 29/005; B23Q 1/42; B23Q 11/085; F16J 15/3284; F16J 15/3294
See application file for complete search history.

(56) References Cited

U.S. PATENT DOCUMENTS 4,080,009 A * 3/1978 Marathe ................. B23Q 1/385 108/143
4,504,067 A * 3/1985 Cather, Jr. ............. F16J 15/322 277/575
(Continued)

FOREIGN PATENT DOCUMENTS

CN 1093232 C 10/2002
DE 4334311 A1 * 4/1995 ................ F16P 1/00
(Continued)

OTHER PUBLICATIONS

GlobalSpec, Linear Actuators Information, https://www.globalspec.com/learnmore/motion_controls/linear_actuators/linear_actuators.

*Primary Examiner* — Oluseye Iwarere
*Assistant Examiner* — Daniel K Schlak
(74) *Attorney, Agent, or Firm* — Renner, Otto, Boisselle & Sklar, LLP

(57) ABSTRACT

A movable manufacturing component includes a base structure and a carriage mechanism movable relative to the base structure. The movable manufacturing component further includes a strip seal component arranged between the base structure and the carriage mechanism such that the carriage mechanism moves along the strip seal component as the carriage mechanism moves relative to the base structure. The strip seal component can have at least one guide surface that restricts lateral movement of the strip seal component as the carriage mechanism moves longitudinally along the base.

15 Claims, 7 Drawing Sheets

(51) Int. Cl.

| | |
|---|---|
| ***B23Q 11/08*** | (2006.01) |
| ***F16C 29/00*** | (2006.01) |
| ***F16C 29/02*** | (2006.01) |
| ***F16J 15/16*** | (2006.01) |

(52) U.S. Cl.
CPC ............ *F16C 29/005* (2013.01); *F16C 29/02* (2013.01); *F16C 29/08* (2013.01)

(56) References Cited

U.S. PATENT DOCUMENTS

| | | | | | |
|---|---|---|---|---|---|
| 4,692,039 | A * | 9/1987 | Teramachi | F16C 29/00 | 384/49 |
| 4,706,510 | A * | 11/1987 | Zimmer | B23Q 11/085 | 74/89.21 |
| 4,878,390 | A * | 11/1989 | Hauser | B23Q 5/404 | 74/89.33 |
| 4,963,038 | A * | 10/1990 | Asano | F16J 15/3204 | 384/15 |
| 4,991,494 | A * | 2/1991 | Migliori | F15B 15/082 | 92/88 |
| RE33,884 | E * | 4/1992 | Kasuga | F16C 29/088 | 384/15 |
| 5,170,675 | A * | 12/1992 | Kawashima | B23Q 11/0875 | 74/89.41 |
| 5,268,970 | A * | 12/1993 | Tanaka | F16C 29/00 | 384/43 |
| 5,306,089 | A * | 4/1994 | Anada | F16C 29/088 | 384/15 |
| 5,342,127 | A * | 8/1994 | Agari | F16C 29/064 | 384/15 |
| 5,358,336 | A * | 10/1994 | Agari | F16C 29/088 | 384/15 |
| 5,362,155 | A * | 11/1994 | Ichida | F16C 29/088 | 384/15 |
| 5,374,127 | A * | 12/1994 | Agari | F16C 29/088 | 384/15 |
| 5,419,736 | A * | 5/1995 | Lo | B23Q 11/0875 | 403/109.8 |
| 5,473,971 | A * | 12/1995 | Takeuchi | B23Q 1/28 | 92/88 |
| 5,492,412 | A * | 2/1996 | Tsukada | F16C 29/088 | 384/15 |
| 5,494,354 | A * | 2/1996 | Tsukada | F16C 29/086 | 384/15 |
| 5,575,216 | A * | 11/1996 | Yuasa | F16C 29/088 | 104/119 |
| 5,598,043 | A | 1/1997 | Hirano et al. | | |
| 5,690,431 | A * | 11/1997 | Schon | B23Q 11/085 | 384/15 |
| 5,778,758 | A * | 7/1998 | Barth | F16C 29/082 | 92/88 |
| 5,868,499 | A * | 2/1999 | Greubel | F15B 15/084 | 384/15 |
| 5,871,282 | A * | 2/1999 | Yuasa | F16C 29/065 | 277/412 |
| 6,241,230 | B1 * | 6/2001 | Kawaguchi | F16H 25/2418 | 310/12.32 |
| 6,290,395 | B1 * | 9/2001 | Pletschet | B23Q 1/267 | 384/42 |
| 6,336,393 | B1 * | 1/2002 | LeMire | F16C 33/20 | 92/88 |
| 6,435,719 | B1 * | 8/2002 | Riedel | F16C 29/082 | 384/49 |
| 6,520,320 | B1 * | 2/2003 | Wang | B23Q 1/58 | 198/750.7 |
| 6,571,932 | B1 | 6/2003 | Kawashima et al. | | |
| 6,658,999 | B1 * | 12/2003 | Schoch | B30B 15/041 | 384/39 |
| 6,662,934 | B1 * | 12/2003 | Lida | F15B 15/082 | 198/750.7 |
| 7,735,632 | B1 * | 6/2010 | Garlow | F16C 29/08 | 198/860.3 |
| 2002/0157922 | A1 * | 10/2002 | Kaneko | F16C 29/08 | 198/698 |
| 2003/0059134 | A1 * | 3/2003 | Mochizuki | F16C 29/0647 | 384/15 |
| 2005/0238266 | A1 * | 10/2005 | Nakagawa | F16C 29/0642 | 384/15 |
| 2007/0246889 | A1 * | 10/2007 | Schnetzler | F16C 29/008 | 277/345 |
| 2008/0260306 | A1 * | 10/2008 | Kuwabara | F16C 29/065 | 384/15 |
| 2013/0142458 | A1 * | 6/2013 | Nakagawa | F16C 29/0602 | 384/15 |
| 2014/0294327 | A1 * | 10/2014 | Yoshida | F16C 29/088 | 384/15 |
| 2014/0321777 | A1 * | 10/2014 | Yoshida | F16J 15/56 | 384/15 |
| 2015/0010253 | A1 * | 1/2015 | Shibuya | F16C 29/0609 | 384/15 |
| 2015/0110426 | A1 * | 4/2015 | Matsumoto | F16C 29/065 | 384/15 |
| 2016/0333928 | A1 * | 11/2016 | Spinner | F16C 29/08 | |
| 2019/0185270 | A1 * | 6/2019 | Wang | H02K 5/00 | |
| 2020/0056656 | A1 * | 2/2020 | Herchenreder | F16C 39/02 | |
| 2021/0355993 | A1 * | 11/2021 | Sato | F16C 29/08 | |
| 2022/0299064 | A1 * | 9/2022 | Cerniglia | B29C 33/44 | |
| 2023/0160474 | A1 * | 5/2023 | Reukers | F16J 15/3284 | 277/549 |

FOREIGN PATENT DOCUMENTS

| | | | | |
|---|---|---|---|---|
| DE | 19837212 | A1 * | 2/2000 | H02K 41/02 |
| EP | 662567 | A2 | 7/1995 | |
| EP | 2865907 | A1 * | 4/2015 | F16C 41/007 |
| JP | 2010144829 | A * | 7/2010 | F16C 29/06 |
| WO | WO-2008056380 | A1 * | 5/2008 | F16C 29/082 |
| WO | 2019042338 | A1 | 3/2019 | |

* cited by examiner

GUIDED STRIP SEAL FOR LINEAR ACTUATOR

This application claims priority to U.S. Application No. 63/375,968 filed Sep. 16, 2022, which is hereby incorporated herein by reference in its entirety.

TECHNICAL FIELD

The present invention relates to a strip seal component that has a layer that restricts lateral movement of the strip seal component during travel of a carriage mechanism of a movable manufacturing component, such as a linear actuator.

BACKGROUND

Linear actuation systems are used in manufacturing settings and frequently include a carriage mechanism that travels linearly along a rail of a base structure. To prevent undesired material from impacting travel of carriage mechanism along the rail, such as particles on the rail, the linear actuation system can include a sealing structure arranged between the base structure and the carriage mechanism. Conventional sealing structures typically include a strip of metal, such as stainless steel, that engages the base structure to keep particles out while also flexing to accommodate travel of the carriage mechanism.

SUMMARY

The present application provides a movable manufacturing component that includes a coated strip seal component that has a layer that restricts lateral movement of the strip seal component during travel of a carriage mechanism of the movable manufacturing component. Conventional flexible metal strips that engage the base structure to keep particles out while also flexing have trouble maintaining proper contact with the base structure after the strip flexes to accommodate the movement of the carriage mechanism. Moreover, conventional flexible strips are made from thin strips of metal that wear as the carriage mechanism runs along the strip. In contrast, as the carriage mechanism travels along a base structure, the disclosed guide surface interacts with the base structure to restrict the lateral movement. The coating of the strip seal component is further configured to lower the frictional coefficient of the strip seal compared to the conventional metallic strip seal member.

According to an aspect of the disclosure, a movable manufacturing component comprising: a base structure; a carriage mechanism movable relative to the base structure; and a strip seal component arranged between the base structure and the carriage mechanism such that the carriage mechanism moves along the strip seal component as the carriage mechanism moves relative to the base structure, wherein the strip seal component has at least one guide surface formed on a side of a strip seal member that restricts lateral movement of the strip seal component as the carriage mechanism moves longitudinally along the base.

According to another aspect of the disclosure, a movable manufacturing component comprising: a base structure; a carriage mechanism movable relative to the base structure; and a strip seal component arranged between the base structure and the carriage mechanism such that the carriage mechanism moves along the strip seal component as the carriage mechanism moves relative to the base structure, wherein the strip seal component has a first layer on a first side of a strip seal member, wherein the strip seal component has a second layer on a second side of the strip member, wherein the second side is opposite the first side, wherein the first layer has a lower friction coefficient compared to a friction coefficient of the strip seal member, wherein the second layer has a lower friction coefficient compared to the friction coefficient of the strip seal member.

According to a further aspect of the disclosure, a coated strip seal component for a movable manufacturing component comprising: a strip seal member comprising a rectangular strip of flexible material; a first layer of a first polymer material attached on a first side of the strip seal member, wherein the first polymer material has a lower friction coefficient compared to a friction coefficient of the flexible material; and a second layer of a second polymer material attached on a second side of the strip seal member that opposes the first side, wherein the second polymer material has a lower friction coefficient compared to the friction coefficient of the flexible material wherein the first layer covers a first portion of surface area of the first side and the second layer covers a second portion of surface area of the second side, wherein the first portion is smaller than the second portion.

The above presents a simplified summary in order to provide a basic understanding of some aspects of the systems and/or methods discussed herein. It is not an extensive overview of the systems and/or methods discussed herein. Nor is it intended to identify key/critical elements or to delineate the scope of such systems and/or methods.

DETAILED DESCRIPTION

Figure 1:
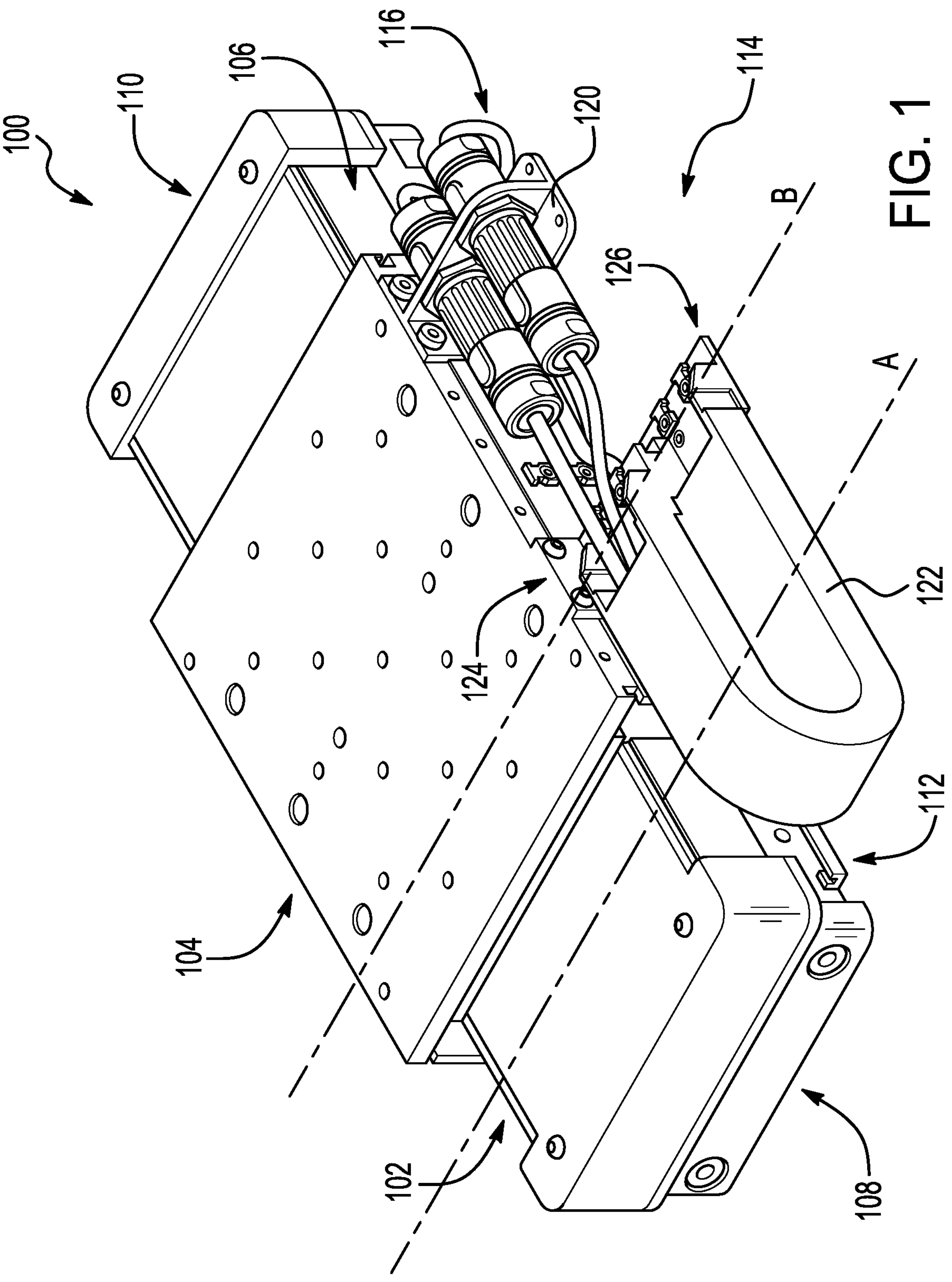
FIG. 1 illustrates an exemplary movable manufacturing component.

Aspects of the present application pertain to a guided strip seal component which are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

Turning to FIG. 1, illustrated is a movable manufacturing component 100 that includes a base structure 102, a carriage mechanism 104 that moves relative along the base structure 102, and a strip seal component 106 attached to the base structure 102 and arranged between the base structure 102 and the carriage mechanism 104. The base structure 102 includes a first end 108, a second end 110, and a base 112 that extends between and connects the first end 108 and the second end 110.

The base structure 102 can further include one or more rails (e.g., rail 200 in FIG. 2) that extend along a portion of the base 112 and form a travel path of the carriage mechanism 104. In an exemplary embodiment, the one or more rails extend along the length of the base 112 such that the carriage mechanism 104 travels between the first end 108 and the second end 110. In another embodiment, the rail(s) extends for a portion that is less than the length of the base 112. The length of the rail(s) may depend on the shape of the carriage mechanism 104, the size of the carriage mechanism 104, the use of the movable manufacturing component 100, and/or the like.

In the illustrated embodiments, the movable manufacturing component 100 acts similarly to a linear actuator where the carriage mechanism 104 travels linearly along the base 112. The movable manufacturing component 100 may further include an actuating system 114 that moves the carriage mechanism 104 along the rail(s). In the illustrated embodiment, the actuating system 114 includes a motor 116 that drives movement of the carriage mechanism 104 via cables 118 with a portion attached to the carriage mechanism 104 and another portion attached to the base structure 102. In the illustrated embodiment, the actuating system 114 includes two motors 116 that are attached to the carriage mechanism 104, and move therewith, via a first attachment structure 120.

The actuating system 114 can further include a cable management chain 122 that covers a portion of the cables 120 to prevent the cables from becoming entangled by the movement of the carriage mechanism 104. In the illustrated embodiment, the cable management chain 122 is attached at a first end 124 to the carriage mechanism 104 and at a second end 126 is attached to the base structure 102 so the cable management chain 122 can move as the carriage mechanism 104 moves.

To prevent undesired material entering the movable manufacturing component 100 that may impact travel of carriage mechanism 104 along the base structure 102, the movable manufacturing component 100 can further include structure arranged between the base structure 102 and the carriage mechanism 104. As noted above, the structure is flexible to maintain contact with the base structure 102 while also accommodating movement of that carriage mechanism that includes outward curving portions. However, conventional flexible strip seal components that are used for this purpose have trouble maintaining proper contact with the base structure 102 after the strip seal component 106 flexes to accommodate the movement of the carriage mechanism 104. Moreover, as noted above, conventional flexible strip seal components are made from thin strips of metal that wear as the carriage mechanism 104 runs along the strip.

To overcome one or more shortcomings of conventional strip seal components, the movable manufacturing component 100 includes an exemplary strip seal component 106 with a guide surface on a side of the strip seal component 106 that can restrict lateral movement of the strip seal component 106 as the carriage mechanism 104 moves along the base structure 102. In one embodiment, the guide surface on the strip seal component 106 is a layer attached to the side of the strip seal component 106. In another embodiment, the guide surface on the strip seal component 106 comprises a step or protrusion formed on the side of the strip seal component 106.

The guide surface can be configured to selectively engage a portion of the base structure 102 to keep the strip seal component 106 in a particular alignment with respect to the base structure 102 as the carriage mechanism 104 travels along the base structure 102. The guide surface can take any suitable shape and/or size and may extend along the entire length of the strip seal component 106 or portions thereof. For instance, one guide surface may extend an entire length of a strip seal component, while another guide surface may extend only a portion of the length of another strip seal component. The shape, size, and/or length of the guide surface may depend on the portion of the base structure 102 engaged by the guide surface. As will be described in detail below, the strip seal component 106 may include a second layer on a second side of the strip seal component 106 to limit wear on the second side of the strip seal component 106 that engages the carriage mechanism 104.

Figure 2:
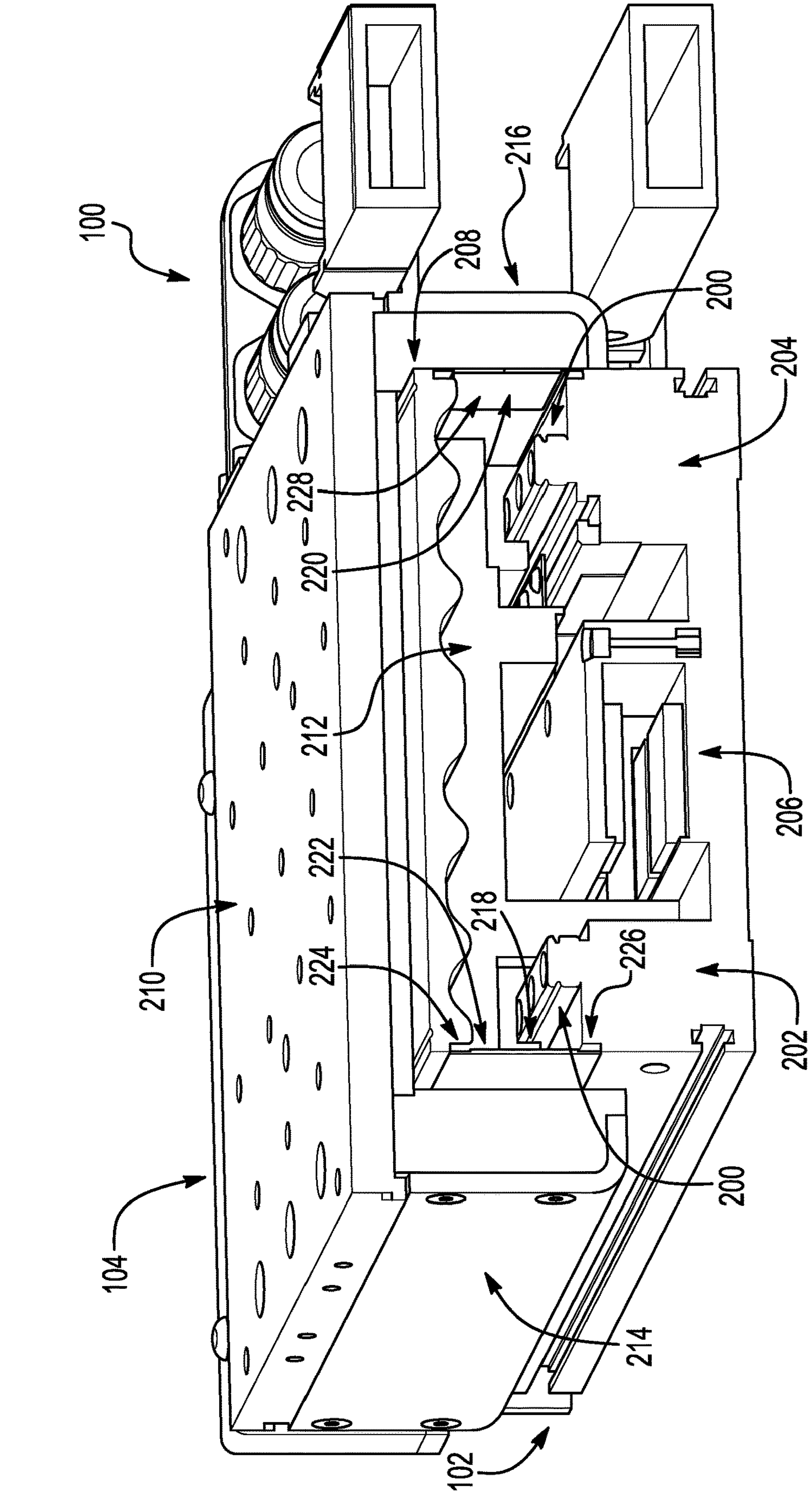
FIG. 2 illustrates a cross-sectional view of the exemplary movable manufacturing component of FIG. 1 taken about the line A in FIG. 1.

Turning now to FIG. 2, illustrated is a first cross-sectional view of the movable manufacturing component 100 taken along line A. The illustrated base structure 102 includes two rails 200 positioned on separate upright supports 202 and 204 of the base 112. In the illustrated embodiment, the base 112 further includes a magnetic track 206 that is selectively magnetized to drive movement of the carriage mechanism 104. However, any suitable movement system can be used to drive the carriage mechanism 104 along the rails 200. The base structure 102 further includes a top 208 that extends between the first end 108 and the second end 110.

The top 208 is spaced from the base 112 to define an interior of the base structure 102 and the carriage mechanism 104 is shaped to extend across and around the top 208 and extend into the interior of the base structure 102. The carriage mechanism 104 can include any suitable components and in the illustrated embodiment includes an upper carriage 210 that rides on the top 208, an undercarriage 212 that extends in the interior of the base structure 102, and two cartridges 214 and 216 that are connected on opposite sides of the upper carriage 210 to connect the upper carriage 210 and the undercarriage 212. Because the carriage mechanism 104 both surrounds the top 208 and extends into the interior of the base structure 102, the strip seal component 106 must be able to engage the top 208 and the base 112 to seal the interior of the base structure 102 while also flexing to accommodate passage of the carriage mechanism 104.

As mentioned above, conventional strip seal components returning from a flexed position to an initial unflexed position suffer from issues maintaining appropriate contact with the top 208 and the base 112. The strip seal component 106 of the current application includes a layer 222 on an inside side of the strip seal component 106 that forms a guide surface (e.g., guide surface 224) to engage the base structure 102. In the illustrated embodiment, because the base structure 102 is rectangular, the movable manufacturing component 100 includes two strip seal components 218 and 220 arranged on opposite sides of the base 112 and/or top 208. As can be seen in FIG. 2, each strip seal component 218 and 220 includes a corresponding layer 222 and 226 on an inner side of the strip seal component 218 and 220 to form the guide surface. Discussion is now made with respect to the strip seal component 218 but may also be applied to strip seal component 220.

The illustrated strip seal component 218 has a rectangular cross-section but any suitable cross-section may be used, such as ovular, triangular, hexagonal, and/or the like. The shape of the cross-section may depend on the shape of the structure the strip seal component is sealing, the arrangement that flexes the strip seal component, and/or the like. Moreover, in the illustrated embodiment, the strip seal component 218 has a uniform thickness for the length of the strip seal component 218, but different portions may have different thicknesses as desired.

The layer on the strip seal component 218 is shaped to form two guide surfaces. A first guide surface 224 shaped to engage the top 208 and a second guide surface 226 shaped to engage the base 112. The layer 222 can form the guide surfaces 224 and 226 via any suitable arrangement. For instance, the layer 222 can have a first thickness in a first portion and a second smaller thickness at the guide surface (e.g., guide surface 224). In another example, the layer 222 covers a portion of the inward facing side of the strip seal component 218 leaving a portion uncovered, the uncovered portion forming the guide surface. By forming a particular guide surface, the strip seal component 218 engages the base 112 and/or top 208 at a particular repeatable orientation which minimizes the chance of misalignment between the strip seal component 218 and those components.

Figure 3:
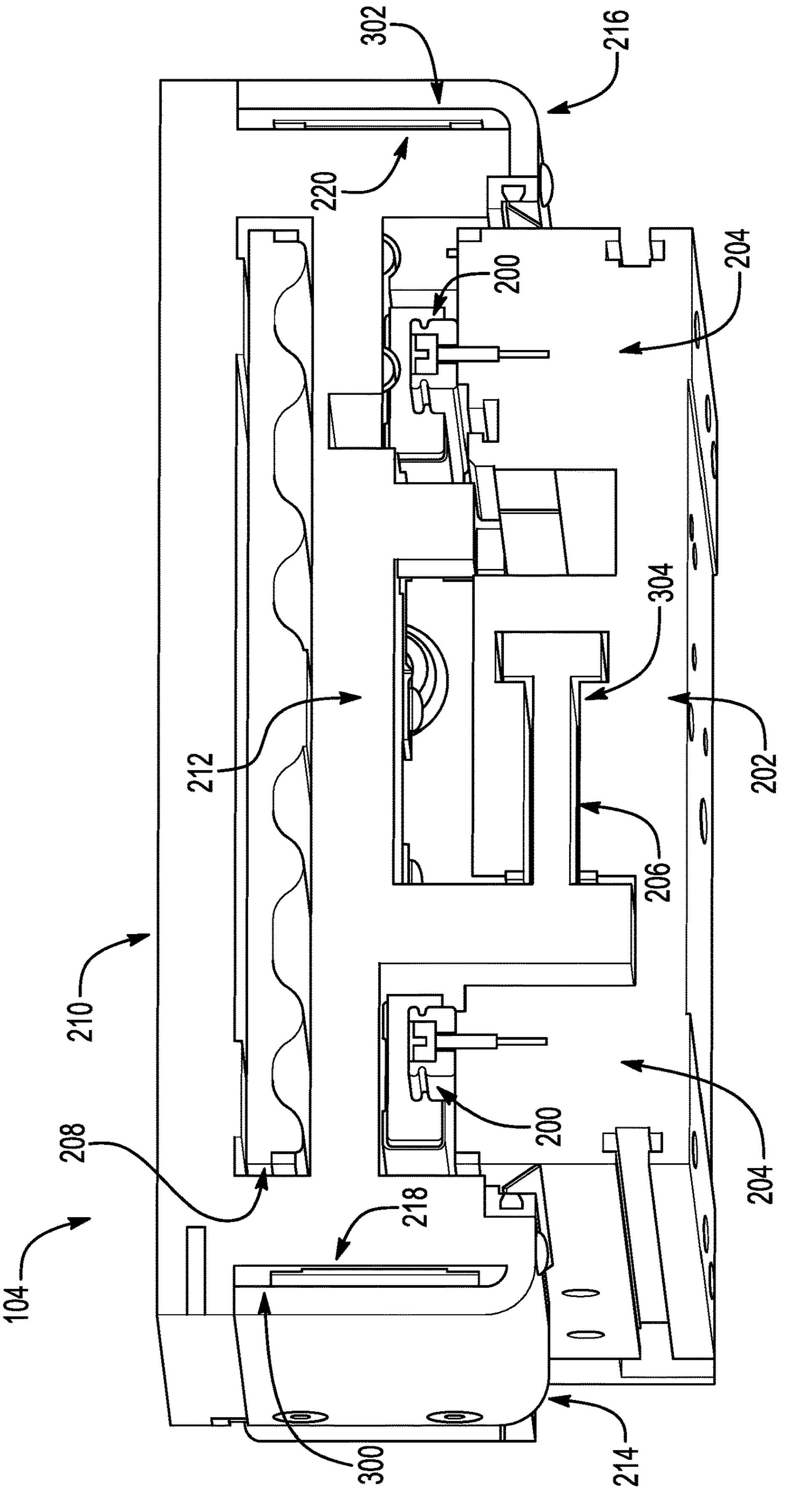
FIG. 3 illustrates another cross-sectional view of the exemplary movable manufacturing component of FIG. 1 taken about the line B in FIG. 1.

As briefly mentioned above, since the carriage mechanism 104 surrounds the top 208 of the base structure 102 and extends into and through the interior of the base structure 102, the strip seal component (e.g., strip seal components 218 and 220) is further configured to flex to accommodate the travel of the carriage mechanism 104. Turning to FIG. 3, illustrated is a second cross-sectional view of the embodiment of the movable manufacturing component 100 along line B. As can be seen in FIG. 3, the carriage mechanism 104 is configured to flex the strip seal components (e.g., strip seal components 218 and 220) away from the interior of the base structure 102 to accommodate travel of the carriage mechanism 104. The illustrated carrier mechanism 104 flexes the strip seal components outward because strip seal components 218 and 220 engage outward facing surfaces of the top 208 and the base 112. In another embodiment, the strip seal component can engage inward facing surfaces and a carrier mechanism is configured to flex a strip seal component inwardly toward the interior of the base structure 102.

In the illustrated embodiment, the undercarriage 212 is shaped to form a first gap 300 with cartridge 214 and a second gap 302 with cartridge 216. Gap 300 is shaped to flex strip seal component 218 outward and gap 302 is shaped to flex strip seal component 220 outward. The gaps 300 and 302 can have any suitable shape for flexing their respective strip seal component outward.

The undercarriage 212 additionally includes a magnetic drive protrusion 304 that engages with the magnetic track 206 to drive movement of the carriage mechanism 104 in response to selective activation of portions of the magnetic track 206.

Figure 4:
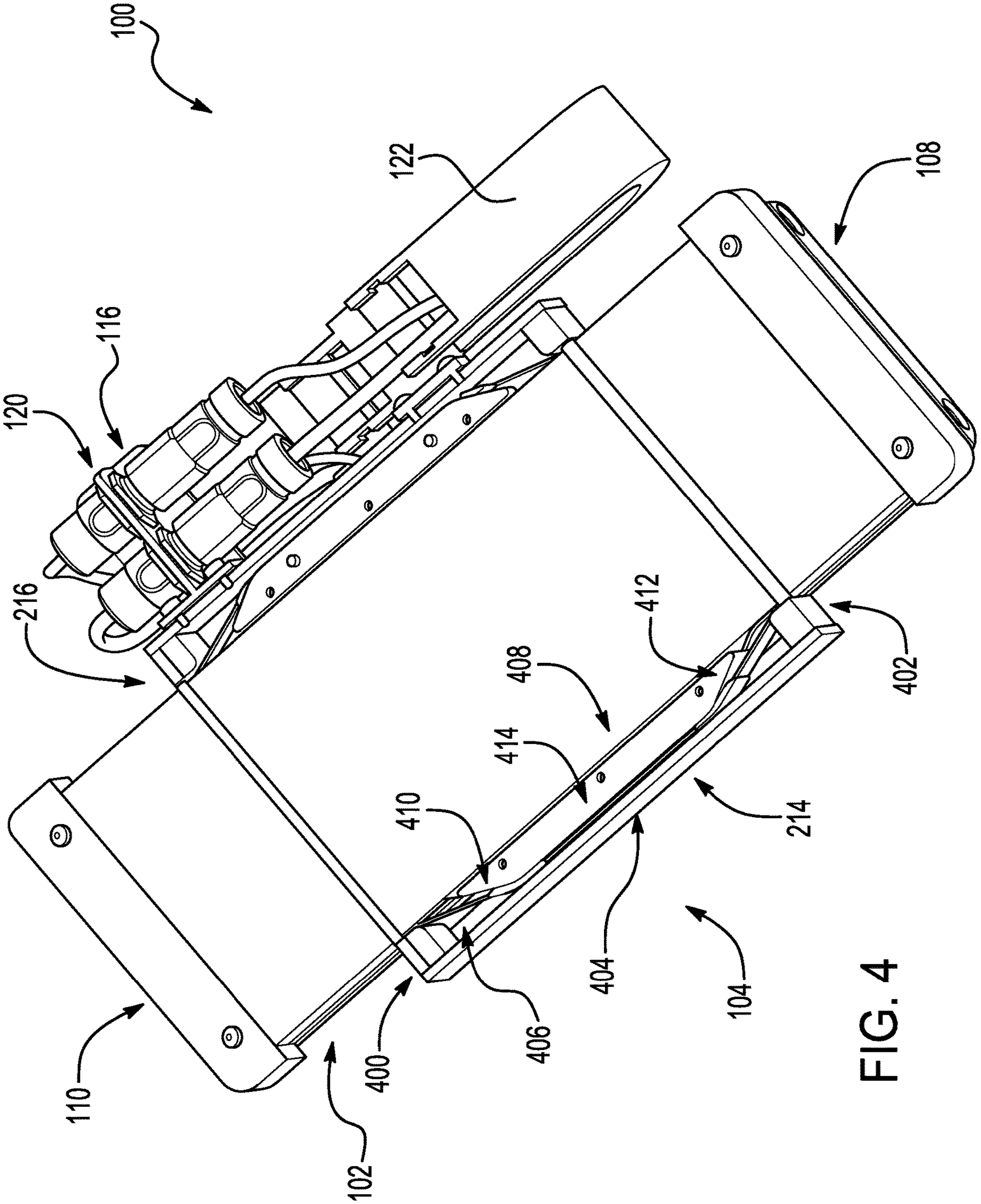
FIG. 4 illustrates a top plan view of the exemplary movable manufacturing component of FIG. 1.

Turning now to FIG. 4, illustrated is a top plan view of the movable manufacturing component 100 in which the top 208 of the carriage mechanism 104 is removed to expose the gaps 300 and 302. Discussion is now made with respect to gap 300, but the described features can also be applied to gap 302. Cartridge 214 includes a first panel 400, a second panel 402, a bottom panel 404 that extends between the first and second panel 400 and 402, and a back panel 406 that similarly extends between the first and second panel 400 and 402 that define a cartridge space when the top 208 is attached to the carriage mechanism 104. The undercarriage 212 includes a guide protrusion 408 that extends into the cartridge space to define gap 300. The guide protrusion 408 is configured to guide the flexing motion of the strip seal component 218 and may include any suitable structure to guide the flexing. In the illustrated embodiment, the guide protrusion 408 includes a first ramp 410, a second ramp 412, and a planar surface 414 extending between the first ramp 410 and the second ramp 412. In an illustrative embodiment, the carriage mechanism 104 travels toward the first end 108 which causes a portion of the strip seal component 218 to flex outward by travelling along the first ramp 410 then along the planar surface 414 before returning to a unflexed position by travelling along the second ramp 412.

Figure 5:
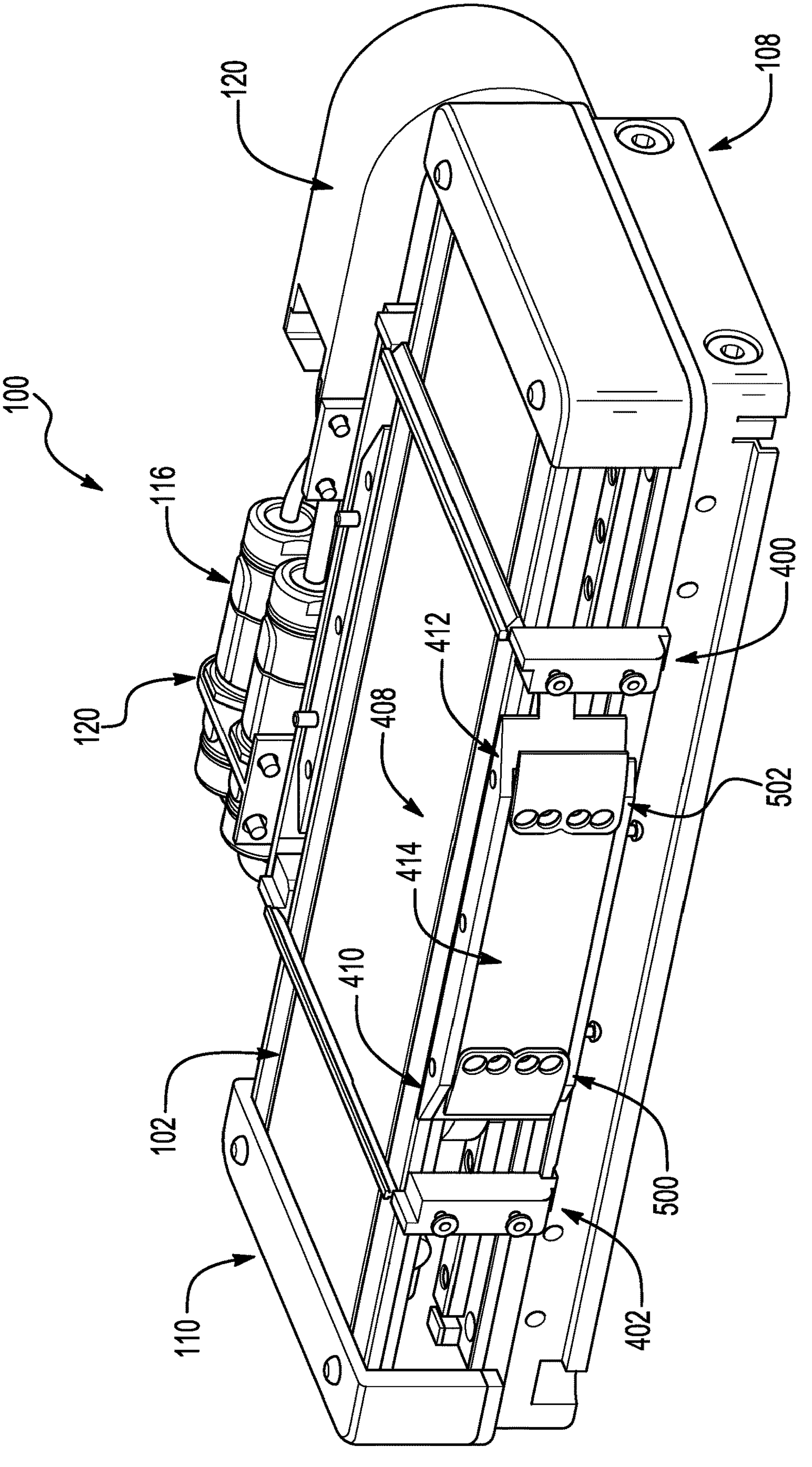
FIG. 5 illustrates a side perspective view of the exemplary movable manufacturing component of FIG. 1.

The undercarriage 212 may include additional structure to guide movement of the strip seal component. Illustrated in FIG. 5 is the movable manufacturing component 100 with the top 208, the bottom panel 404, and the back panel 408 of the carriage mechanism 104 removed as well as strip seal component 218 to provide a clearer view of the guide protrusion 408. In addition to the guide protrusion 408 described above, the undercarriage mechanism 104 can include ramp attachments 500 and 502 shaped to decrease stress on the strip seal component 218 as the strip seal component 218 transitions from the planar surface 414 to the first ramp 410 and vice-versa and/or from the planar surface 414 to the second ramp 412 and vice-versa. In the illustrated embodiment, ramp attachment 500 is connected to the guide protrusion 408 to smooth transition between the planar surface 414 and the first ramp 410 while ramp attachment 502 is connected to smooth transition between the planar surface 414 and the second ramp 412.

Figure 6:
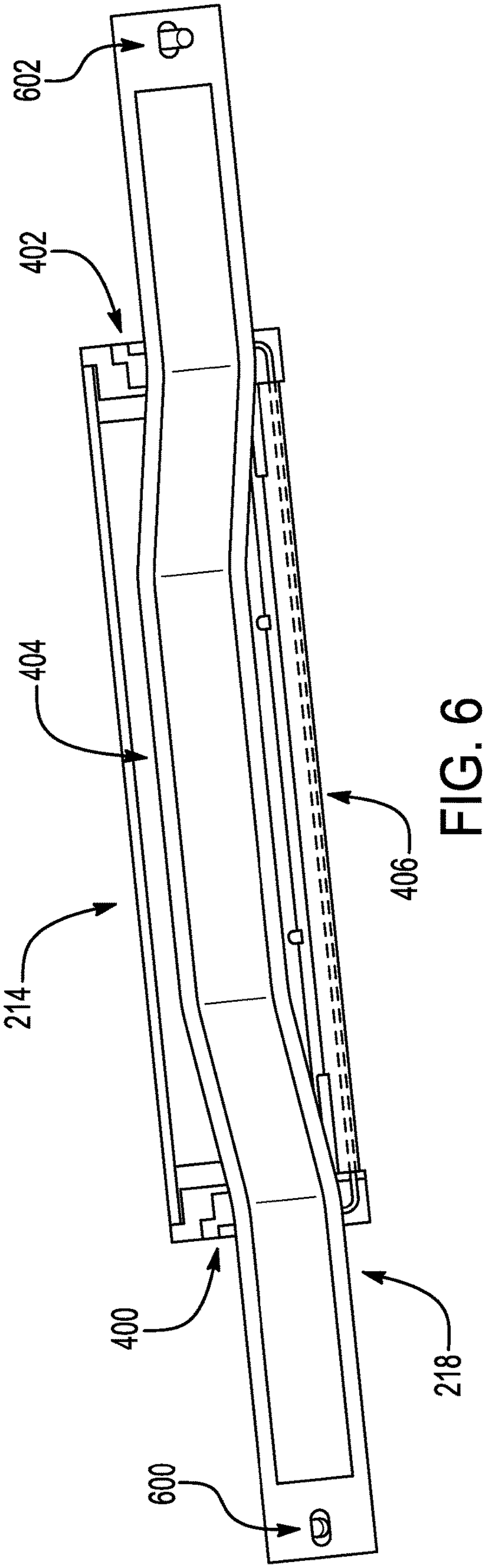
FIG. 6 illustrates a view of an exemplary coated strip seal flexing in a cartridge of the movable manufacturing component.

Turning now to FIG. 6, illustrated is a view of the strip seal component 218 flexing in the cartridge 214. As can be seen, the first panel 400 and the second panel 402 are used to limit which portions of the strip seal component 218 flex as the carriage mechanism 104 moves. More particularly, the first panel 400 and/or the second panel 402 can press the strip seal component 218 into engagement with the carriage mechanism 104 and/or the base 112.

The strip seal component 218 can be attached to any suitable component of the movable manufacturing component 100. In the embodiments illustrated herein, the strip seal component 218 is secured at a first portion to the first end 108 of the base structure 102 and at a second portion to the second end 110 of the base structure 102. Any suitable attachment system or method can be used to attach the strip seal component 218. The illustrated embodiment of the strip seal component 218 in FIG. 6 includes a first aperture 600 at a first end and a second aperture 602 at a second end. The apertures 600 and 602 can be shaped to accommodate a fastener or fasteners that extend through the apertures 600 and 602 to attach to the base structure 102. Any suitable fastener can be used, such as a bolt, a nail, a screw, a magnet, and/or the like.

Figure 7:
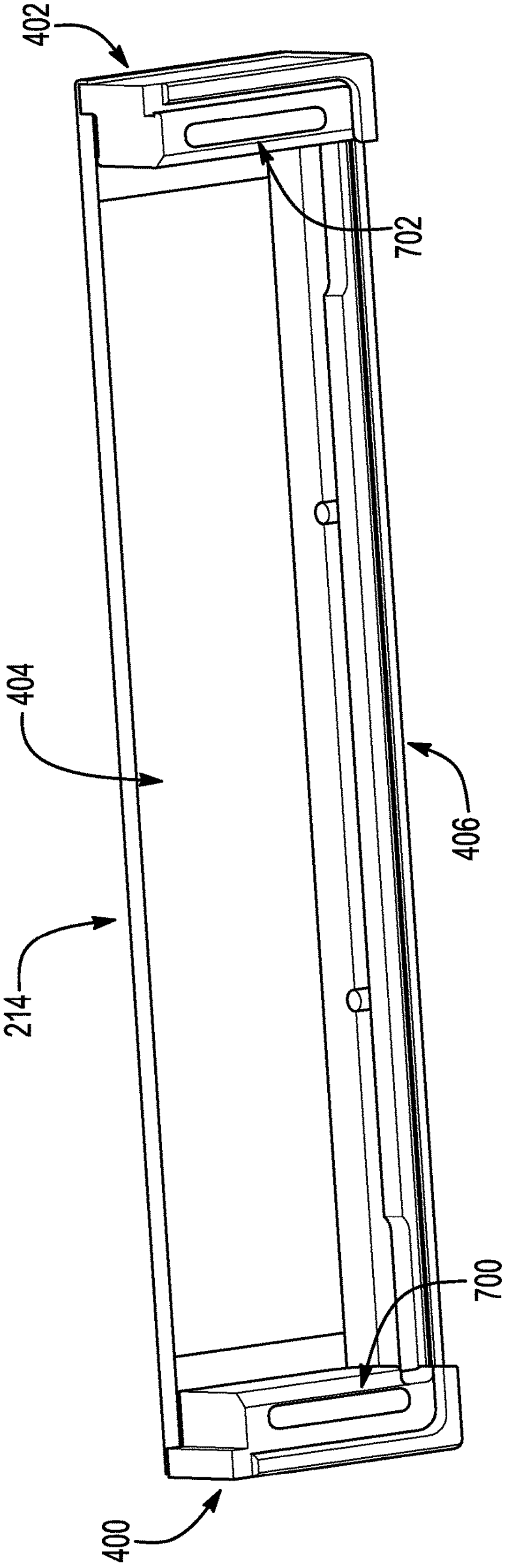
FIG. 7 illustrates a cartridge of a carriage mechanism used in the movable manufacturing component in FIG. 1 in isolation.

The first panel 400 and the second panel 402 may further include one or more pressing surfaces that engages or presses on the strip seal component 218 as the cartridge 214 travels along the strip seal component 218. The pressing surface can be used to reduce friction generated when the cartridge 214 travels along the strip seal component 218 and can be made of a different material compared to the first panel 400 and/or the second panel 402. In the embodiment illustrated in FIG. 7, the first panel 400 includes a first engagement protrusion 700 that extends outwardly from the first panel 400 to engage the strip seal component 218. Similarly, the second panel 402 includes a second engagement protrusion 702 that extends outwardly from the second panel 402 to engage the strip seal component 218.

Figure 8:
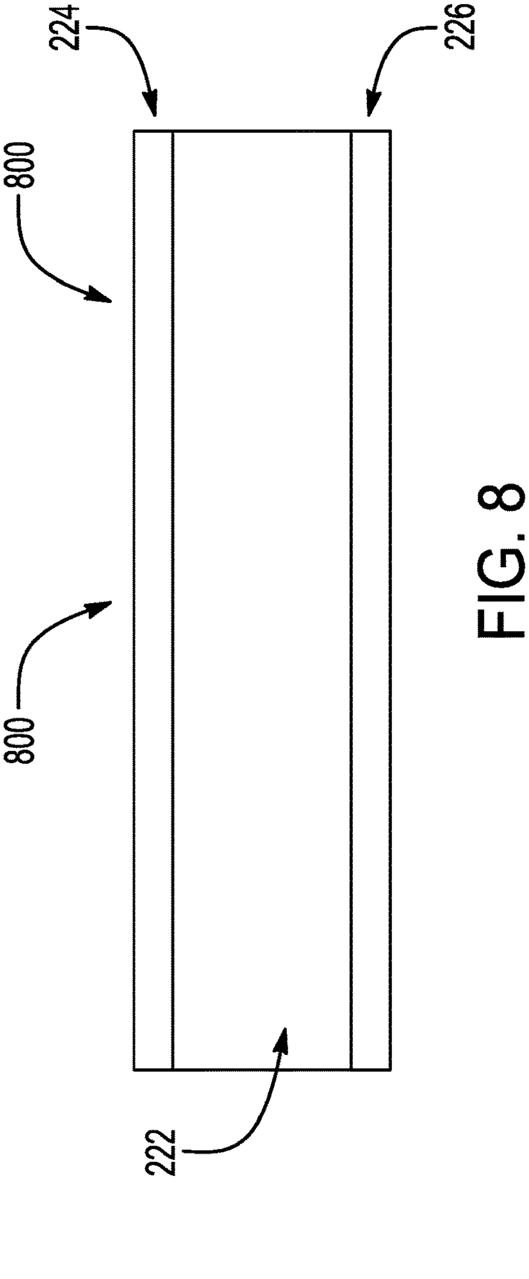
FIG. 8 illustrates another exemplary coated strip seal.

FIG. 8 illustrates a second side 800 of the strip seal component 216 which includes the layer 222 that defines the first guide surface 224 and the second guide surface 226. The first guide surface 224 can be shaped to extend along a first portion of the second side 800 and the second guide surface 226 can be shaped to extend along a second portion of the second side 800. The first guide surface 224 and the second guide surface 226 can have the same length along the second side 800, as illustrated, and/or the lengths can vary. In the illustrated embodiment, the first guide surface 224 extends along a first edge of the second side 800 and the second guide surface 226 extends along a second edge of the second side 800 that is opposite the first edge, such that the first guide surface 224 and the second guide surface 226 extend parallel one another.

As noted above, a strip seal component of the movable manufacturing component 100 can include a plurality of different layers on different sides of the strip seal member. For instance, the strip seal component can include a first layer on a first side of a strip seal member that forms one or more guide surfaces and a second layer on a second side of the strip seal member. The second layer can be used to limit wear on strip seal member as the carriage mechanism 104 travels along the base structure 102. The first layer and the second layer can have similar thicknesses and/or the thickness can vary. Further, the first layer and the second layer can cover similar surface areas of their respective sides of the strip seal member and/or the surface areas covered can vary.

Figure 9:
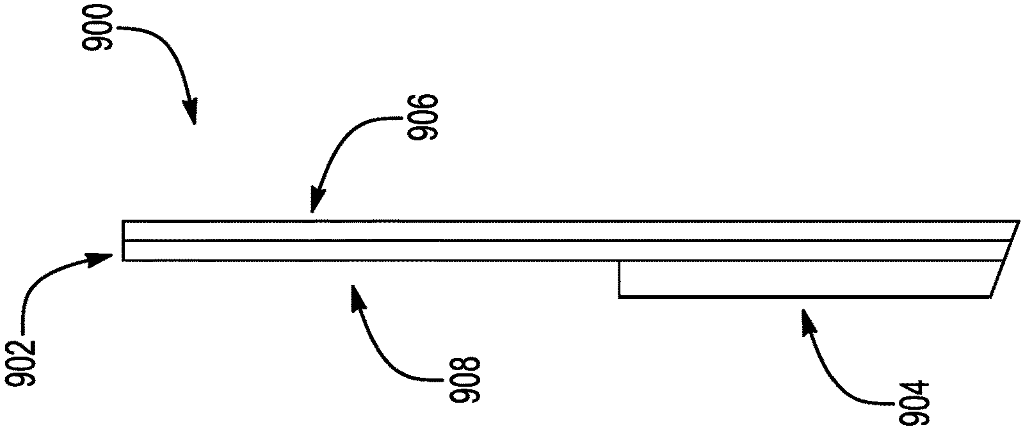
FIG. 9 illustrates yet another exemplary coated strip seal.

Illustrated in FIG. 9 is a profile view of a strip seal component 900 that includes a strip seal member 902 with a first layer 904 on a first side of the strip seal member 902 and a second layer 906 on a second side of the strip seal member 902. The first layer 904 only covers a portion of a width of the first side of the strip seal member 902, leaving another portion uncovered forming a guide surface 908 on the first side of the strip seal member 902. In comparison, the second layer 906 has the same width as the width of the second side of the strip seal member 902. The illustrated first layer 904 and second layer 906 have different thicknesses, namely the first layer 904 is thicker than the second layer 906. Because the first layer 904 is used to form the guide surface, a thicker first layer 904 can form a guide surface that more reliably engages the corresponding portion of the base structure 102 to seal the interior of the base structure 102.

The different parts of the movable manufacturing component 100 described above can be formed of any suitable material and may vary based on the purpose of the part. For instance, a strip seal member (e.g., strip seal member 902) is made of a flexible metal that allows the strip seal member to flex as needed, such as stainless steel, a steel alloy, and/or the like. In contrast, a layer on the metal strip seal member can be made of a different material and different layers on the strip seal member can be made of similar material and/or may vary. For instance, the layer (e.g., the first layer 904, the second layer 906) can be made of a material that has frictional coefficient that is lower than the frictional coefficient of the metal of the strip seal member. Such material can include, but is not limited to, thermoplastic polyethylene, ultra-high-molecular-weight (UHMW) polyethylene, polymer fibers, and/or the like.

To avoid premature wearing down of the layer(s) on the strip seal component as the carriage mechanism 104 moves back and forth along the base structure 102, the parts that engage with the layer(s) on the strip seal component can be formed of non-metallic material. For instance, the engagement protrusions 700 and 702 (FIG. 7) of the cartridge may similarly be formed of a low friction polymer, such as UHMW polyethylene. Similarly, the ramp attachments 500 and 502 (FIG. 5) can be formed of a non-metallic material. Because the ramp attachments 500 and 502 are expected to maintain their shape as the strip seal component flexes around them, the ramp attachments 500 and 502 can be formed of a material that is stiffer and/or harder than the material of the layer(s). For example, the ramp attachments 500 and 502 can be made of acetal, a combination of acetal and UHMW polyethylene, and/or the like.

According to an aspect of the disclosure, a movable manufacturing component comprising: a base structure; a carriage mechanism movable relative to the base structure; and a strip seal component arranged between the base structure and the carriage mechanism such that the carriage mechanism moves along the strip seal component as the carriage mechanism moves relative to the base structure, wherein the strip seal component has at least one guide surface formed on a side of a strip seal member that restricts lateral movement of the strip seal component as the carriage mechanism moves longitudinally along the base.

Exemplary embodiments may include one or more of the following additional features, separately or in any combination.

In exemplary embodiment(s), the strip seal component has a layer on a side of a strip seal member that forms the at least one guide surface.

In exemplary embodiment(s), the layer is a first material and the strip seal member is a second material, wherein the first material has a lower friction coefficient compared to a friction coefficient compared of the second material.

In exemplary embodiment(s), the first material comprises ultra high molecular weight (UHMW) polyethylene, wherein the second material comprises stainless steel.

In exemplary embodiment(s), the layer is shaped to leave a portion of the side of the strip seal member uncovered, wherein the at least one guide surface is an edge of the layer at the uncovered portion of the side of the strip seal member.

In exemplary embodiment(s), the uncovered portion includes a first strip extending along a first portion of the side of the strip seal member and a second strip extending along a second portion of the side of the strip seal member.

In exemplary embodiment(s), the first strip extends along a first edge of the layer and the second strip extends along a second edge of the layer, wherein the first edge is opposite the second edge.

In exemplary embodiment(s), the strip seal component further has a second layer on a second side of the strip seal member, wherein the second side is opposite the first side, wherein the layer covers a first portion of surface area of the side of the strip seal member and the second layer covers a second portion of surface area of the second side of the strip seal member.

In exemplary embodiment(s), the first portion is smaller than the second portion.

In exemplary embodiment(s), the strip seal component is configured to flex as the carriage mechanism moves relative to the base structure, wherein the carriage mechanism includes structure that flexes the strip seal component away from the base structure.

In exemplary embodiment(s), further comprising a second strip seal component arranged between the base structure and the carriage mechanism such that the carriage mechanism additionally moves along the second strip seal component as the carriage mechanism moves relative to the base structure.

According to another aspect of the disclosure, a movable manufacturing component comprising: a base structure; a carriage mechanism movable relative to the base structure;

and a strip seal component arranged between the base structure and the carriage mechanism such that the carriage mechanism moves along the strip seal component as the carriage mechanism moves relative to the base structure, wherein the strip seal component has a first layer on a first side of a strip seal member, wherein the strip seal component has a second layer on a second side of the strip member, wherein the second side is opposite the first side, wherein the first layer has a lower friction coefficient compared to a friction coefficient of the strip seal member, wherein the second layer has a lower friction coefficient compared to the friction coefficient of the strip seal member.

Exemplary embodiments may include one or more of the following additional features, separately or in any combination.

In exemplary embodiment(s), the first layer forms at least one guide surface that restricts lateral movement of the strip seal component as the carriage mechanism moves longitudinally along the base.

In exemplary embodiment(s), the strip seal component comprises stainless steel, wherein the first layer comprises UHMW polyethylene.

In exemplary embodiment(s), the strip seal component is configured to flex as the carriage mechanism moves relative to the base structure, wherein the carriage mechanism includes structure that flexes the strip seal component away from the base structure.

In exemplary embodiment(s), the structure has a first stiffness, wherein the first layer has a second stiffness that is lower than the first stiffness.

In exemplary embodiment(s), the first layer has a first thickness, wherein the second layer has a second thickness that is smaller than the first thickness.

According to a further aspect of the disclosure, a coated strip seal component for a movable manufacturing component comprising: a strip seal member comprising a rectangular strip of flexible material; a first layer of a first polymer material attached on a first side of the strip seal member, wherein the first polymer material has a lower friction coefficient compared to a friction coefficient of the flexible material; and a second layer of a second polymer material attached on a second side of the strip seal member that opposes the first side, wherein the second polymer material has a lower friction coefficient compared to the friction coefficient of the flexible material wherein the first layer covers a first portion of surface area of the first side and the second layer covers a second portion of surface area of the second side, wherein the first portion is smaller than the second portion.

Exemplary embodiments may include one or more of the following additional features, separately or in any combination.

In exemplary embodiment(s), the first layer is shaped to form a guide surface that engages a base structure of the movable manufacturing component.

In exemplary embodiment(s), the strip seal component is configured to flex as a carriage mechanism of the movable manufacturing component moves relative to the base structure.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term “or” is intended to mean an inclusive “or” rather than an exclusive “or.” That is, unless specified otherwise, or clear from the context, the phrase “X employs A or B” is intended to mean any of the natural inclusive permutations. That is, the phrase “X employs A or B” is satisfied by any of the following instances: X employs A; X employs B; or X employs both A and B. In addition, the articles “a” and “an” as used in this application and the appended claims should generally be construed to mean “one or more” unless specified otherwise or clear from the context to be directed to a singular form. Additionally, as used herein, the term “exemplary” is intended to mean serving as an illustration or example of something and is not intended to indicate a preference.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a “means”) used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A movable manufacturing component comprising:
a base structure;
a carriage mechanism movable relative to the base structure; and
a strip seal component arranged between the base structure and the carriage mechanism such that the carriage mechanism moves along the strip seal component as the carriage mechanism moves relative to the base structure,
wherein the strip seal component has at least one guide surface formed on a side of a strip seal member that restricts lateral movement of the strip seal component as the carriage mechanism moves longitudinally along the base structure,
wherein the strip seal component has a layer on the side of the strip seal member that forms the at least one guide surface,
wherein the layer is shaped to leave a portion of the side of the strip seal member uncovered, wherein the at least one guide surface is an edge of the layer at the uncovered portion of the side of the strip seal member, and
wherein the guide surface engages a surface of the base structure and the layer engages a second surface of the base structure.

2. The movable manufacturing component of claim 1, wherein the layer is a first material and the strip seal member is a second material, wherein the first material has a lower friction coefficient compared to a friction coefficient of the second material.

3. The movable manufacturing component of claim 2, wherein the first material comprises ultra high molecular weight (UHMW) polyethylene, wherein the second material comprises stainless steel.

4. The movable manufacturing component of claim 1, wherein the uncovered portion includes a first strip extending along a first portion of the side of the strip seal member and a second strip extending along a second portion of the side of the strip seal member.

5. The movable manufacturing component of claim 4, wherein the first strip extends along a first edge of the layer and the second strip extends along a second edge of the layer, wherein the first edge is opposite the second edge.

6. The movable manufacturing component of claim 1, wherein the strip seal component further has a second layer on a second side of the strip seal member, wherein the second side is opposite the side, wherein the layer covers a first portion of surface area of the side of the strip seal member and the second layer covers a second portion of surface area of the second side of the strip seal member.

7. The movable manufacturing component of claim 6, wherein the first portion is smaller than the second portion.

8. The movable manufacturing component of claim 1, wherein the strip seal component is configured to flex as the carriage mechanism moves relative to the base structure, wherein the carriage mechanism includes structure that flexes the strip seal component away from the base structure.

9. The movable manufacturing component of claim 1, further comprising a second strip seal component arranged between the base structure and the carriage mechanism such that the carriage mechanism additionally moves along the second strip seal component as the carriage mechanism moves relative to the base structure.

10. A movable manufacturing component comprising:

a base structure;

a carriage mechanism movable relative to the base structure; and a strip seal component arranged between the base structure and the carriage mechanism such that the carriage mechanism moves along the strip seal component as the carriage mechanism moves relative to the base structure, wherein the strip seal component has a first layer on a first side of a strip seal member, wherein the strip seal component has a second layer on a second side of the strip member, wherein the second side is opposite the first side, wherein the first layer has a lower friction coefficient compared to a friction coefficient of the strip seal member, wherein the second layer has a lower friction coefficient compared to the friction coefficient of the strip seal member, and wherein the strip seal component is configured to flex as the carriage mechanism moves relative to the base structure, wherein the carriage mechanism includes structure that flexes the strip seal component away from the base structure.

11. The movable manufacturing component of claim 10, wherein the first layer forms at least one guide surface that restricts lateral movement of the strip seal component as the carriage mechanism moves longitudinally along the base.

12. The movable manufacturing component of claim 10, wherein the strip seal component comprises stainless steel, wherein the first layer comprises UHMW polyethylene.

13. The movable manufacturing component of claim 10, wherein the structure has a first stiffness, wherein the first layer has a second stiffness that is lower than the first stiffness.

14. The movable manufacturing component of claim 10, wherein the first layer has a first thickness, wherein the second layer has a second thickness that is smaller than the first thickness.

15. A movable manufacturing component comprising:

a base structure;

a carriage mechanism movable relative to the base structure; and a strip seal component arranged between the base structure and the carriage mechanism such that the carriage mechanism moves along the strip seal component as the carriage mechanism moves relative to the base structure, wherein the strip seal component has at least one guide surface formed on a side of a strip seal member that restricts lateral movement of the strip seal component as the carriage mechanism moves longitudinally along the base, wherein the strip seal component has a layer on the side of the strip seal member that forms the at least one guide surface, wherein the layer is shaped to leave a portion of the side of the strip seal member uncovered, wherein the at least one guide surface is an edge of the layer at the uncovered portion of the side of the strip seal member, and wherein the uncovered portion includes a first strip extending along a first portion of the side of the strip seal member and a second strip extending along a second portion of the side of the strip seal member.

* * * * *